(12) United States Patent
Dakhil

(10) Patent No.: US 9,382,120 B2
(45) Date of Patent: Jul. 5, 2016

(54) CARBON DIOXIDE CAPTURE AND STORAGE SYSTEM

(71) Applicant: Farouk Dakhil, Rome (IT)

(72) Inventor: Farouk Dakhil, Rome (IT)

(*) Notice: Subject to any disclaimer, the term of this patent is extended or adjusted under 35 U.S.C. 154(b) by 40 days.

(21) Appl. No.: 14/255,390

(22) Filed: Apr. 17, 2014

(65) Prior Publication Data

US 2015/0298979 A1 Oct. 22, 2015

(51) Int. Cl.
*C01B 31/24* (2006.01)
(52) U.S. Cl.
CPC . *C01B 31/24* (2013.01); *Y02P 20/13* (2015.11)
(58) Field of Classification Search
CPC .... C01B 31/24; B01D 53/62; B01D 53/1475; B01D 2257/504; B01J 8/00; B01J 8/008; B01J 19/00; B01J 19/0053
USPC .......................................... 422/129, 168, 187
See application file for complete search history.

(56) References Cited

U.S. PATENT DOCUMENTS

2014/0234946 A1* 8/2014 Constantz .............. B01D 53/62 435/266
2015/0252352 A1* 9/2015 Corgie ..................... B01J 19/12 210/606

OTHER PUBLICATIONS

Bhaduri et al., "Nickel nanoparticles catalyse reversible hydration of carbon dioxide for mineralization carbon capture and storage", Catalysis Science & Technology, (2013), DOI: 10.1039/c3cy20791a, 6 pages.*

* cited by examiner

*Primary Examiner* — Jill Warden
*Assistant Examiner* — Joye L Woodard
(74) *Attorney, Agent, or Firm* — Maier & Maier, PLLC

(57) ABSTRACT

A system for capturing and storing carbon dioxide. The $CO_2$ sequestration system may include one or more sub-systems for generating electricity, a heat exchange system which may regulate temperature, and a conversion tank. The conversion tank may contain water with dissolved compounds and a catalyst. Carbon dioxide may be converted into carbonate minerals and drawn off to be used in any of a variety of applications.

11 Claims, 7 Drawing Sheets

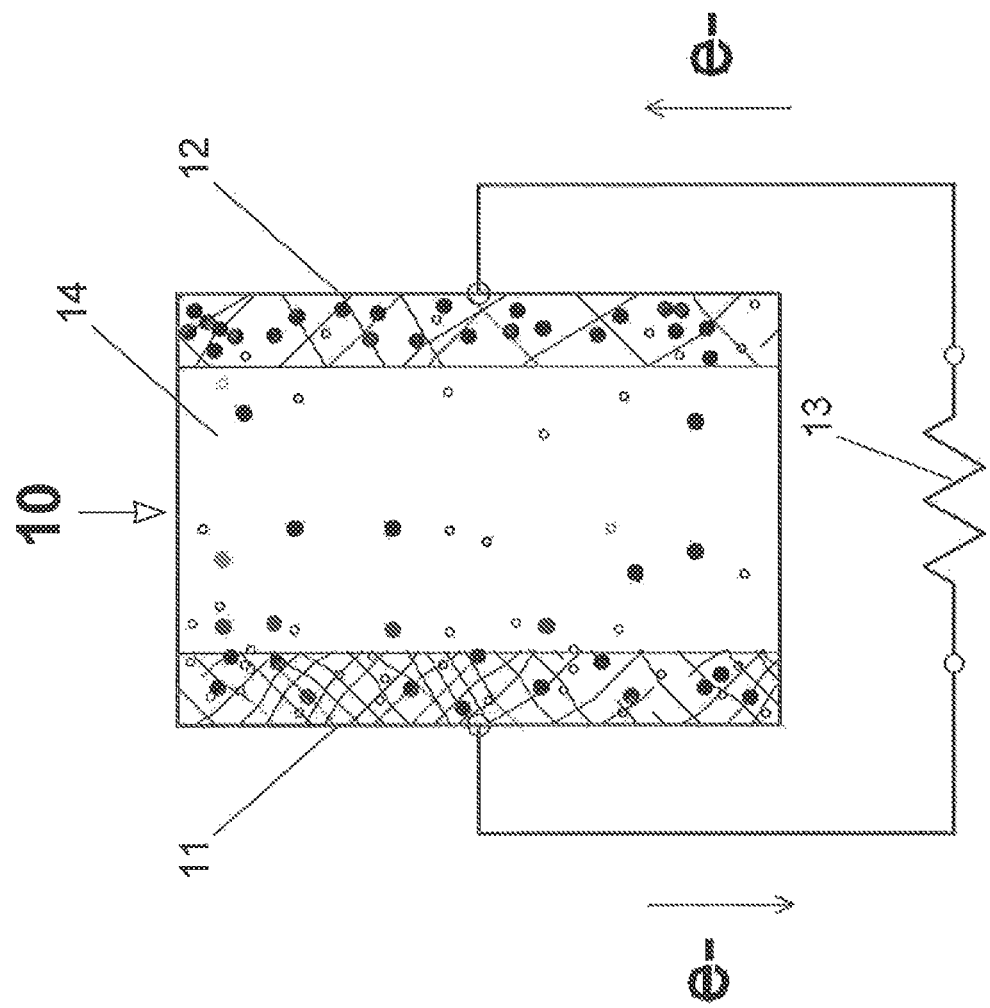

CARBON DIOXIDE CAPTURE AND STORAGE SYSTEM

BACKGROUND

There is increasing scientific evidence that climate change is caused by human-made carbon dioxide ($CO_2$) emissions into the atmosphere. The levels of $CO_2$ have been rising in large part because of human intervention, and they continue to rise as carbon emissions greatly outpace the ability of vegetation to take up and sequester carbon from the atmosphere.

There have been many proposals for solutions in the scientific literature to reduce the effects of climate change precipitated by these increased levels. Some are fantastic, like bringing 16 billion small reflecting mirrors into the stratosphere by space rockets to reflect sun light from coming to earth and thus reduce global warming, while others are more dramatic, such as having rockets inject $SO_2$ into the atmosphere in order to reflect sunlight, though the ozone layer might be damaged by the $SO_2$. Still another solution proposed is one where millions of artificial trees are installed in an open space in which sodium hydroxide is placed in artificial "leaf" structures to capture $CO_2$ that is then stored deep under the ground. The storage of $CO_2$ in deep geological porous rocks, kilometers deep into seafloor has proven to be instable. More significantly, $CO_2$ can leak out into the atmosphere again, which is rather a serious concern. Additionally, research suggests that storing pressurized gas underground can cause earthquakes in the storage area. All of these solutions would cost billions of dollars and are most likely unworkable or have too much risk and/or collateral damage associated with them.

Some additional proposals center around using carbon-capture systems which chemically alter the carbon dioxide into a different compound, for example carbonate minerals. However, all of the proposed ways for accomplishing this involve expensive catalysts which themselves only operate effectively at pH or pressure levels which are unsuitable for mass conversion.

$CO_2$ emissions are mainly produced by fossil fuel power generation plants and some heavy industries. 50% of the worldwide energy supply is provided by coal power plants, 40% by oil and approximately 25% by natural gas, all of which are pumping $CO_2$ gas into the atmosphere through their exhaust. From 1990 to 2012 some 87% of the world's energy was supplied by fossil fuels.

The amount of $CO_2$ in the air is comparatively small: only about 0.64 cubic inch in one 1 cubic foot of air. Thus the $CO_2$ content of air is at 370 ppm, a ratio of 1:3000, but the energy consumed to produce this amount of $CO_2$ is rather high: 0.27 BTU of fossil fuel. Some argue that by sequestering the amount of $CO_2$ in a cubic foot of air we thereby allow the consumption elsewhere of the same amount of energy i.e. allowing 0.27 BTU to be combusted. However, it is insufficient to use this argument without attempting to find a solution to the real underlying problem: pollution caused by energy production and consumption.

There is a need for a solution which can solve both problems at the same time. In particular, current $CO_2$ in the atmosphere needs to be sequestered while also producing less of it at the same time.

SUMMARY

According to at least one exemplary embodiment, a system for capturing and storing carbon dioxide may be disclosed. The $CO_2$ sequestration system may include one or more subsystems for generating electricity, a heat exchange system which may regulate temperature, and a conversion tank. The conversion tank may contain water with dissolved compounds and a catalyst. Carbon dioxide may be converted into carbonate minerals and drawn off to be used in any of a variety of applications.

BRIEF DESCRIPTION OF THE FIGURES

Advantages of embodiments of the present invention will be apparent from the following detailed description of the exemplary embodiments. The following detailed description should be considered in conjunction with the accompanying figures in which:

Exemplary

Exemplary FIG. 2a shows a schematic diagram of a thermocell generating electricity Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, a system for capturing and storing carbon dioxide may be disclosed. The $CO_2$ sequestration system may include one or more subsystems for generating electricity, a heat exchange system which may regulate temperature, and a conversion tank. The conversion tank may contain water with dissolved compounds and a catalyst. Carbon dioxide may be converted into carbonate minerals and drawn off to be used in any of a variety of applications.

Figure 1:
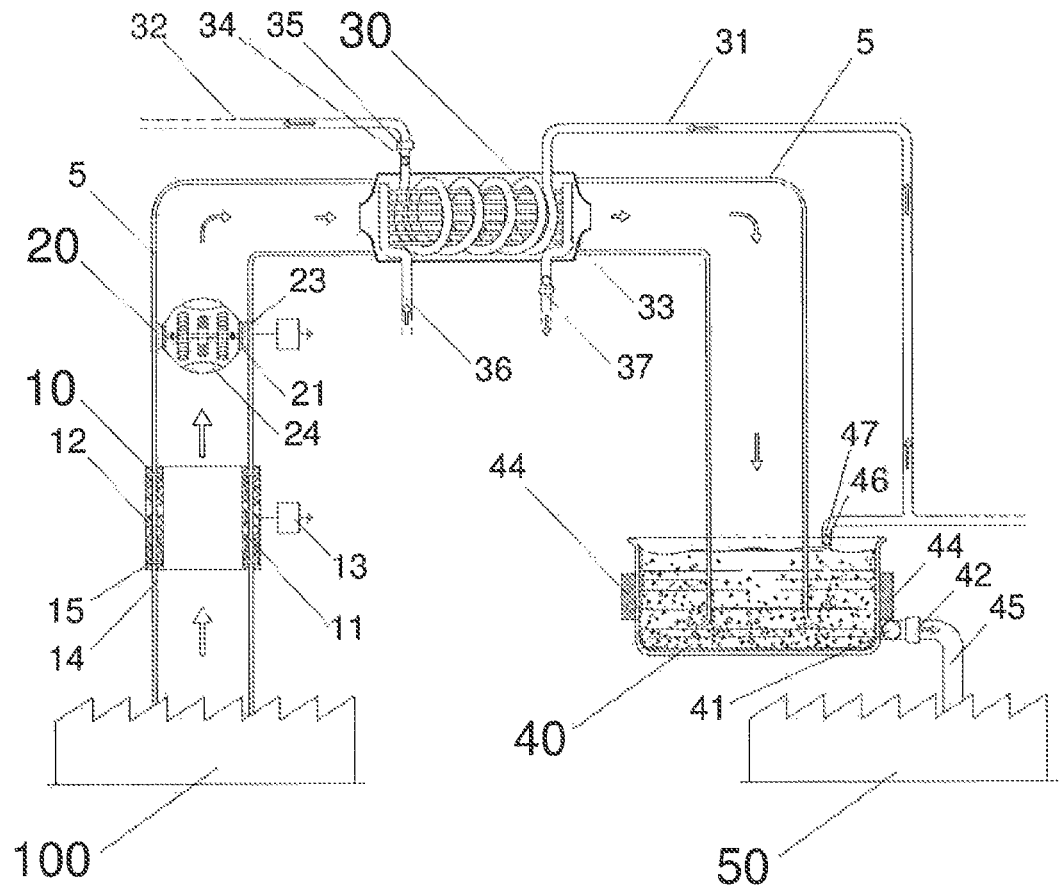
FIG. 1 shows a system diagram for a carbon dioxide capture system

Referring to exemplary FIG. 1, a carbon dioxide ($CO_2$) capture and storage system (CCSS) may include a thermocell 10, a pressure power generating device (PPG) 20, a heat exchange unit 30, and a conversion tank 40. The CCSS may be integrated into a pathway 5 leading from a carbon dioxide source 100. For example, the CCSS may be integrated into a smokestack leading from a power plant or other industrial plant. Thermocell 10 and PPG 20 may be used to generate additional electric power, as further described below. Heat exchange unit 30 may be used to regulate the temperature of $CO_2$ for use in conversion tank 40. Conversion tank 40 may contain water and may facilitate the capture of $CO_2$ into cement. Some material leaving conversion tank 40 may be directed to cement processing plant 50, where materials generated in conversion tank 40 may be processed into cement.

Figure 2:
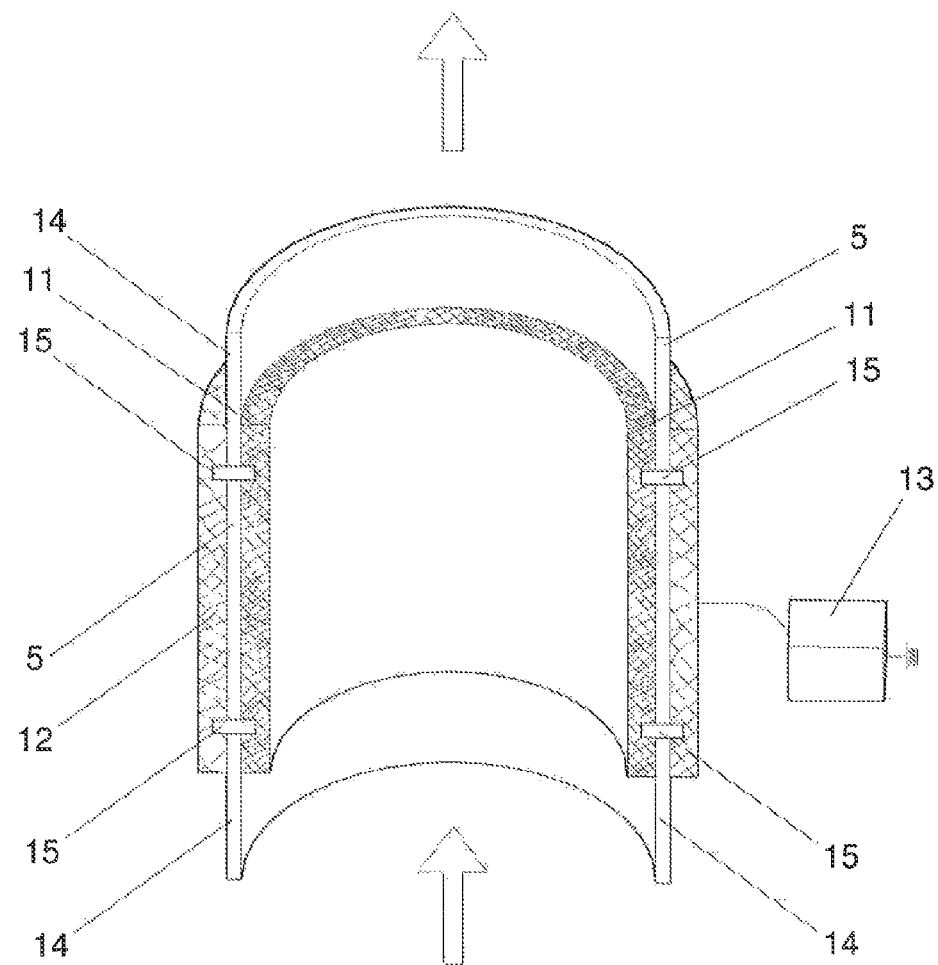
FIG. 2 shows detail of a thermocell for use with the carbon dioxide capture system Exemplary

Exemplary FIG. 2 may show the detail of thermocell 10. As shown in exemplary FIG. 1, thermocell 10 may be placed close to a carbon dioxide source 100, which may allow it to convert the maximum heat available in any emissions or gasses passing through pathway 5. Thermocell 10 may have two plates, an inside plate 11 and an outside plate 12. Inside plate 11 may be an electrode, for example an anode, placed inside pathway 5. Outside plate 12 may be an electrode, for example a cathode, placed outside pathway 5. Plates 11, 12 may be joined by semiconductor 15. Semiconductor 15 may extend through the wall 14 of pathway 5 to connect plates 11, 12. The thickness of wall 14 may function as an insulator separating two electrodes, for example plates 11, 12. Additionally, a heat insulator may be placed on both sides of wall 14 to increase the temperature difference and thereby increase the efficiency of power generation by thermocell 10.

Thermocell 10 may generate an electric current through thermoelectric means. For example, the interior of pathway 5 may be very hot and may heat inside plate 11. The temperature gradient between plates 11, 12 may then enable thermocell 10 to generate a current. The electric power generated by thermocell 10 may be stored in a battery 13, used directly, or as desired. The equation for determining the potential thermoelectric energy created by thermocell 10 is:

$$V = a(T_h - T_c)$$

Where V is the voltage produced, a is the Seebeck coefficient, $T_h$ is the temperature of the hot electrode, and $T_c$ is the temperature of the cold electrode.

Exemplary FIG. 2a illustrates the thermoelectric energy generation of thermocell 10. Inside plate 11 and outside plate 12 may be constructed of the same or different materials to generate the thermoelectric effect. For example, plates 11, 12 may be constructed of different compositions of carbon nanotube materials. The current 13 produced can then be stored or used to do work.

Figure 3:
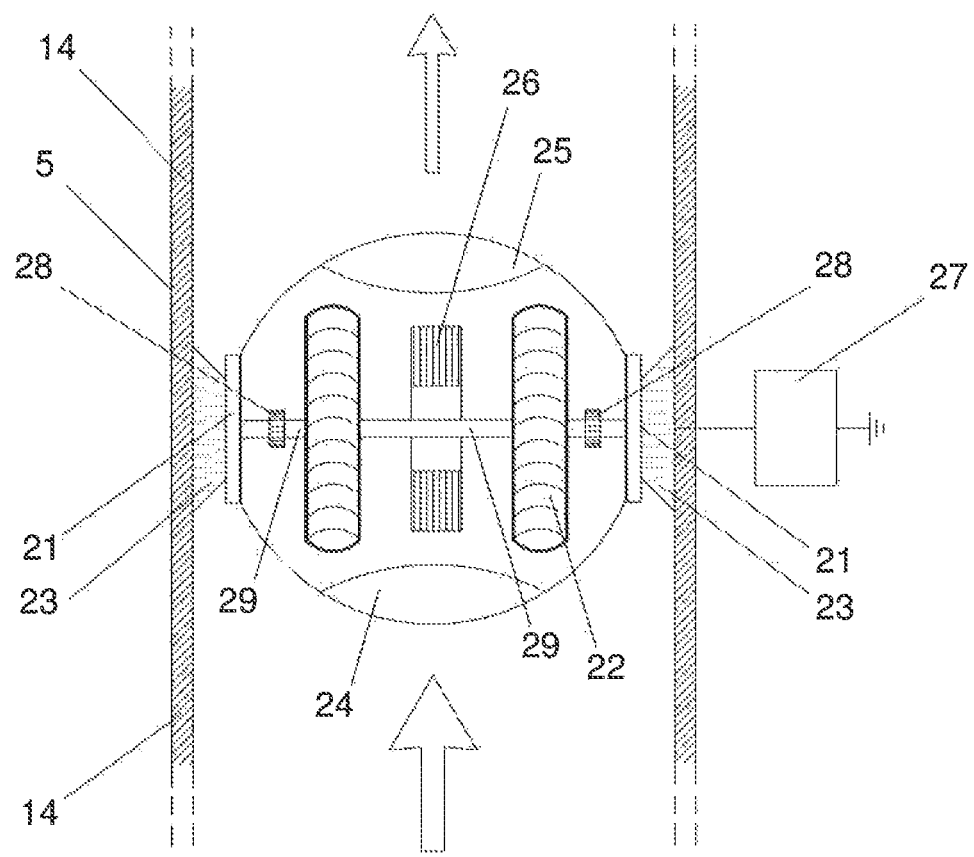
FIG. 3 shows detail of a pressure power generating device Exemplary

Now referring to exemplary FIG. 3, a pressure power generating device (PPG) 20 may be placed inside pathway 5 to generate power. Gasses moving through pathway 5 may enter an opening 24 and may push against blades 22 before exiting through opening 25. Blades 22 may rotate an axis 29 to turn a stator/dynamo 26, which may generate an electric current. Blades 22 may be considered together as one or more turbines rotating on axis 29.

PPG 20 may be affixed to wall 14 by shock-resistant absorbers 23. Axis 29 may rotate inside bearing 28, which itself may be fixed to a support bar 21. Instead of using bearing 28, axis 29 may also be suspended in a magnetic field so as to reduce friction to a minimum and thus increase efficiency of the device. Electric current generated by PPG 20 may be stored in battery 27, used to do work, or as desired.

Referring generally to exemplary FIGS. 2-3, one or more power-generation subsystems may be disclosed. According to at least one exemplary embodiment, the electricity generated by these subsystems may be used to power other portions of a carbon dioxide sequestration system, for example pumps and valves and other components as described below.

Figure 4:
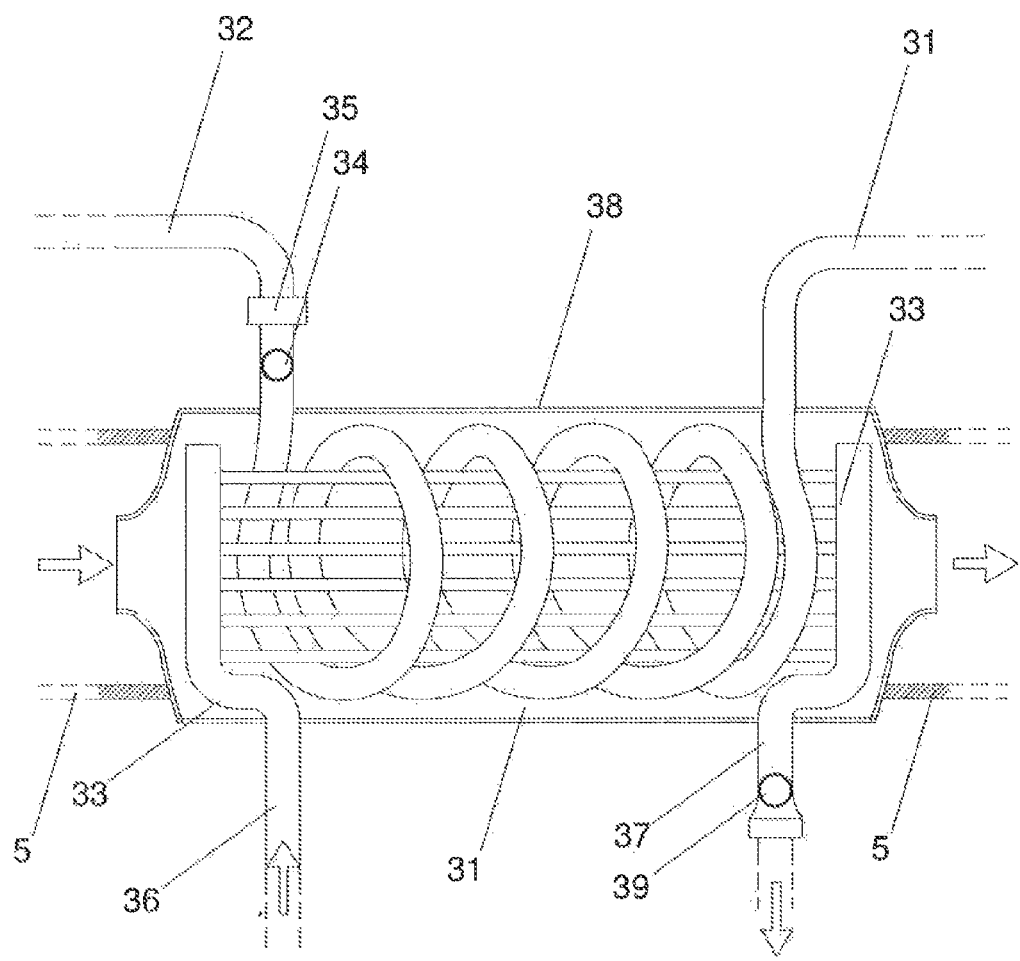
FIG. 4 shows detail of a heat exchange unit Exemplary

Now referring to exemplary FIG. 4, a heat exchange unit 30 may include one or more exchange pipes 31, 33. According to at least one exemplary embodiment, an exchange pipe 31 may be used with sea water and an exchange pipe 33 may be used with fresh water. Fresh water intake 36 may lead to exchange pipe 33, which may have an outflow 37 controlled by sensor 39. Sensor 39 may be used to control the temperature of water flowing out of exchange pipe 33. Heated fresh water flowing out from outflow 37 may be used for household or industrial use, or as desired. Exchange pipe 31 may have an outflow 35 controlled by sensor 34. Sensor 34 may be used to control the temperature of water flowing out of exchange pipe 31. Sensor 34 may also be used to control the amount of heat exchanged to a fresh water exchange system and/or to control the temperature of gas passing through pathway 5.

Figure 5:
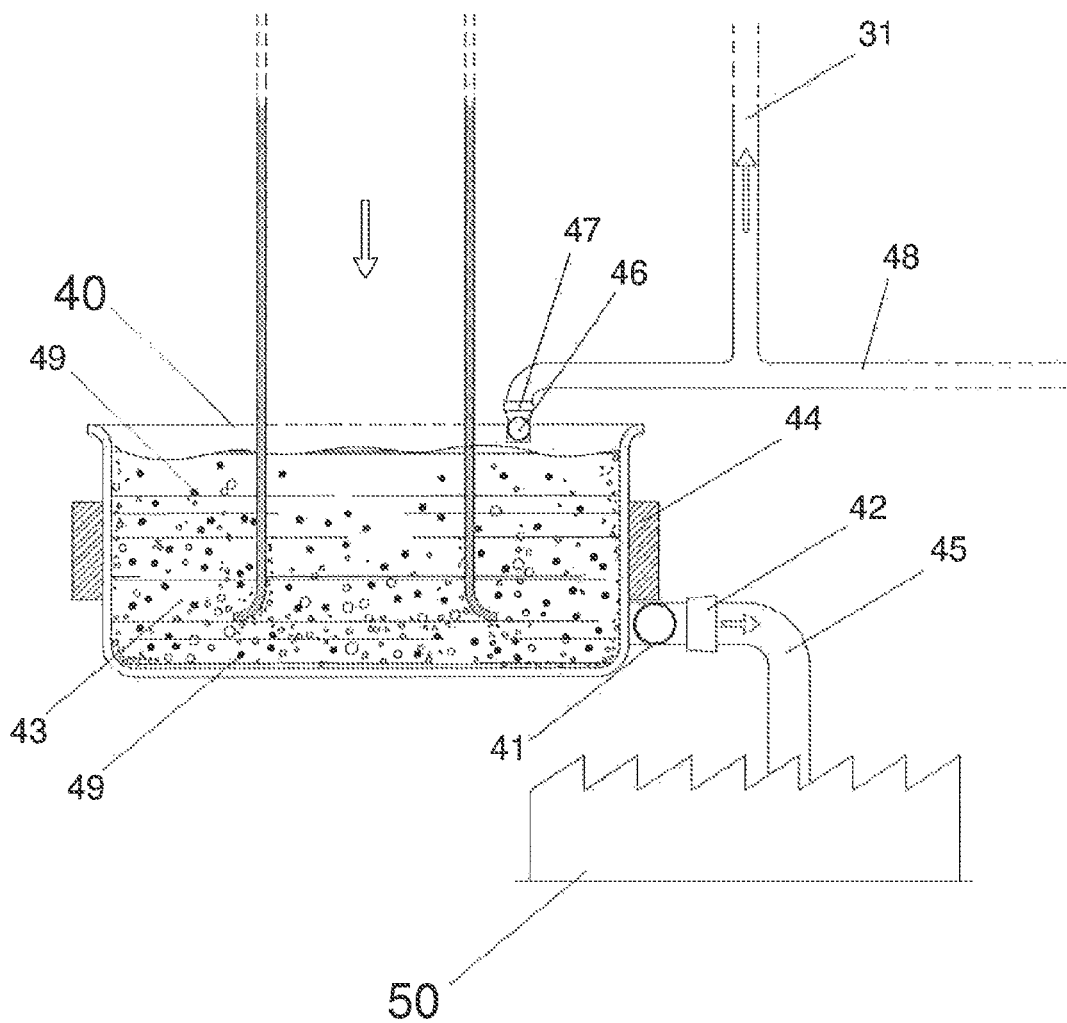
FIG. 5 shows detail of a conversion tank for the processing of carbon dioxide Exemplary

Now referring to exemplary FIG. 5, a conversion tank 40 may be placed at the end of pathway 5 and may contain seawater 43 and a catalyst 49. Seawater 43 may also be any suitable solvent containing dissolved elements suitable for conversion into carbonate minerals. $CO_2$ entering conversion tank 40 may react with sea water 43 and catalyst 49 to create carbonates from the dissolved minerals in the sea water, for example magnesium and calcium carbonates, which may later be extracted and used, for example in the creation of cement. The sequestration of carbon dioxide into carbonates is known in nature, for example sea creatures creating their shells from dissolved carbon in the sea water, but this process is not fast enough to be used at room temperature or atmospheric pressure without a catalyst. Catalyst 49 may be any suitable catalyst, for example, nickel nanoparticles. Because different catalysts work more efficiently at different temperatures, according some embodiments, heat exchange unit 30 may be utilized to control the temperature of gasses passing through pathway 5 and into conversion tank 40. In one exemplary embodiment, heat exchange unit 30 may be used to bring the temperature of the gases down to about 20° C., or approximately room temperature, for use of a nickel nanoparticle catalyst. Some embodiments may preferably use nickel nanoparticles in part because the relative production and operating costs associated with nickel nanoparticles is very low compared to other catalysts suitable for this reaction. For example, nickel is cheap, is magnetic and therefore re-useable using a magnetic separator, and is active at a wide range of pH levels.

Conversion tank 40 may additionally include sensor 41 which may control a valve 42. Sensor 41 may open valve 42 to allow the outflow of material once a desired saturation point of carbonates has been achieved. Outflow may pass through a pipe 45 to processing plant 50. Processing plant 50 may be, for example a cement processing plant. Pipe 45 may also lead to a storage container, a transportation container, or as desired. To prevent the loss of catalyst, a separator 44 may be used. Separator 44 may be, for example, an electromagnet, or a permanent magnet which may be moved into or out of a functional range. Separator 44 may be used to control the amount of catalyst 49 dispersed in conversion tank 40. For example, when it is desired to drain outflow from conversion tank 40, separator 44 may first be activated to draw and hold catalyst 49 in place, for example against the sides of the container. Valve 42 may then be opened to allow outflow of desired materials without significant loss of catalyst 49. Catalyst 49 may therefore be used repeatedly, significantly lowering costs.

Conversion tank 40 may also include sensor 46 controlling valve 47. Valve 47 may lead from water pipe 48. Water pipe 48 may provide a source of sea water for conversion tank 40. Sensor 46 may detect when conversion tank 40 has been drained of sea water 43 and may open valve 47 to allow more sea water in to replenish the supply. Following the refilling of the container, separator 44 may release the catalyst back into the sea water 43, allowing the sequestration reaction of carbon dioxide to restart.

Carbonates received in processing plant 50 may be separated from sea water and processed into white cement. In one embodiment, white cement may be advantageous in other applications because it reflects sunlight, preventing the over-absorption of heat, and therefore can assist in slowing global warming. Alternatively, the carbonates can be used in any known way, such as filler or additive in polymer compounds, acid-free papermaking, ceramic tile adhesives, flooring, fireproofing, and medical and pharmaceutical applications, or as desired.

Figure 6:
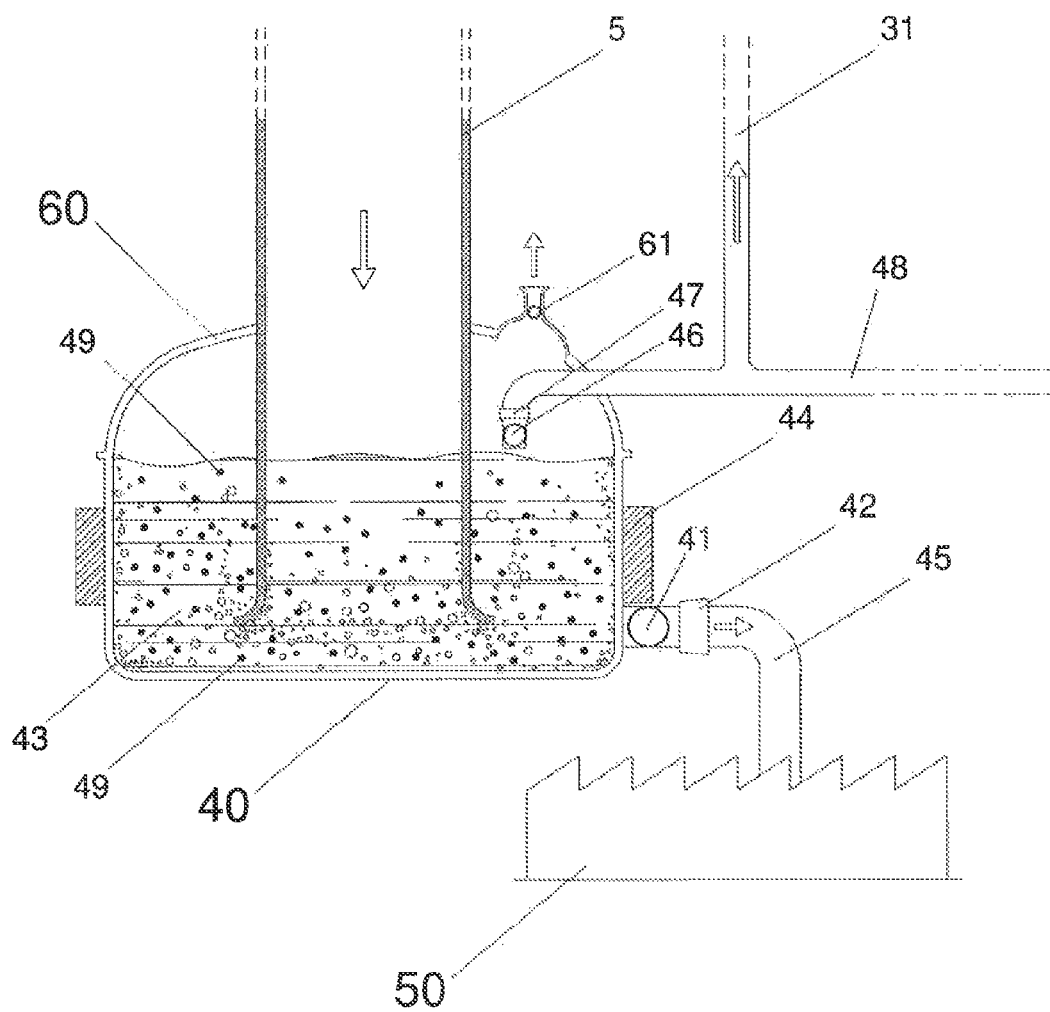
FIG. 6 shows an alternate embodiment of a conversion tank with a cover on top

Exemplary FIG. 6 shows an alternate embodiment of conversion tank 40 with a cover 60. Cover 60 may include a sensor 61 which may control the outflow of gasses into the atmosphere. For example, sensor 61 may detect the levels of carbon dioxide remaining inside conversion tank 40 and may only allow gases to leave when a desired amount of $CO_2$ has been sequestered.

In use, one or more of the above-mentioned systems may be used alone or in combination to reduce $CO_2$ emissions into the atmosphere and/or to create additional energy output using, for example, otherwise wasted industrial emissions. Though exemplary FIG. 1 shows one possible layout, different layouts and orderings of the systems are possible. According to at least one exemplary embodiment, thermocell 10, PPG 20, heat exchange unit 30, and conversion tank 40 may function together as an integrated system achieving high efficiency of power production and carbon sequestration. In one embodiment, gases emitted by an industrial plant at a few hundred degrees Celcius may be cooled by thermocell 10 and heat exchange unit 30, slowed by PPG 20, and excess carbon dioxide may be sequestered by conversion tank 40. Additionally, some embodiments may further include a central control unit (not shown) which may coordinate the different components of an integrated system.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for sequestering carbon dioxide, comprising:
    a conversion chamber containing a solvent with elements capable of forming mineral carbonates, and a catalyst;
    a gas pathway with a first end proximate the conversion chamber and a second end proximate a gas input;
    a separator coupled to the conversion chamber and configured to reversibly remove the catalyst from suspension in the solvent;
    a heat exchanger in the gas pathway between the gas input and conversion chamber configured to control the temperature of gas flowing through the gas input; and
    a bladed turbine generator in the gas pathway between the heat exchanger and the gas input, the bladed turbine generator capable of generating electricity using the physical force of the gas moving through the gas pathway.

2. The system for sequestering carbon dioxide of claim 1, wherein the catalyst is nickel nanoparticles.

3. The system for sequestering carbon dioxide of claim 1, wherein the separator is a magnet.

4. The system for sequestering carbon dioxide of claim 1, wherein the heat exchanger further comprises a first water pipe system and a second water pipe system, wherein the first water pipe system is configured to hold fresh water and the second water pipe system is configured to hold salt water.

5. The system for sequestering carbon dioxide of claim 1, further comprising:
    a thermocell generator in the gas pathway between the gas input and the bladed turbine generator, the thermocell generator capable of generating electricity using the heat energy of the gas moving through the gas pathway.

6. The system of for sequestering carbon dioxide of claim 5, wherein the thermocell generator comprises at least two electrodes, and wherein at least one of the at least two electrodes comprises carbon nanotubes.

7. A system for sequestering carbon dioxide, comprising:
    a gas pathway with a first end proximate to a conversion chamber containing a solvent and a catalyst, and a second end proximate to a gas input;
    a thermocell generator in the gas pathway between the conversion chamber and the gas input;
    a pressure power generator in the gas pathway between the thermocell generator and the conversion chamber, the pressure power generator having at least one bladed turbine;
    a heat exchanger in the gas pathway between the pressure power generator and the conversion chamber, the heat exchanger having at least one exchange pipe;
    wherein the conversion chamber is configured to sequester carbon dioxide in a different chemical compound.

8. The system for sequestering carbon dioxide of claim 7, wherein the solvent is sea water and the catalyst is nickel nanoparticles.

9. The system for sequestering carbon dioxide of claim 7, further comprising a separator coupled to the conversion chamber, the separator configured to control whether or not the catalyst is dispersed in the solvent.

10. The system for sequestering carbon dioxide of claim 7, wherein electricity is generated by at least one of the thermocell generator and the pressure power generator, and wherein at least a portion of the generated electricity is stored in a battery coupled to at least one of the thermocell generator and the pressure power generator.

11. The system of for sequestering carbon dioxide of claim 7, wherein the thermocell generator comprises at least two plates, and wherein at least one of the at least two plates further comprises carbon nanotubes.

* * * * *